United States Patent
Hwang et al.

(10) Patent No.: US 11,909,617 B2
(45) Date of Patent: *Feb. 20, 2024

(54) METHOD AND APPARATUS FOR CONTINUOUS ACCESS NETWORK MONITORING AND PACKET LOSS ESTIMATION

(71) Applicant: ASSIA SPE, LLC, Wilmington, DE (US)

(72) Inventors: Chan-Soo Hwang, Seoul (KR); Jeonghun Noh, La Jolla, CA (US); Parimal Parag, Seattle, WA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,573

(22) Filed: Jan. 10, 2022

(65) Prior Publication Data
US 2022/0141112 A1  May 5, 2022

Related U.S. Application Data

(63) Continuation of application No. 16/192,442, filed on Nov. 15, 2018, now Pat. No. 11,223,550, which is a
(Continued)

(51) Int. Cl.
*H04L 43/0888* (2022.01)
*H04L 43/0864* (2022.01)
(Continued)

(52) U.S. Cl.
CPC ........ *H04L 43/0888* (2013.01); *H04L 41/147* (2013.01); *H04L 43/04* (2013.01);
(Continued)

(58) Field of Classification Search
None
See application file for complete search history.

(56) References Cited

U.S. PATENT DOCUMENTS 6,115,752 A * 9/2000 Chauhan ................. H04L 45/26
709/241
6,765,868 B1 * 7/2004 Dunn .................... H04L 47/822
370/468

(Continued)

*Primary Examiner* — Andrew C Oh
(74) *Attorney, Agent, or Firm* — North Weber & Baugh LLP; Michael North

(57) ABSTRACT

Described is a method for estimating throughput between first and second communication devices, the method comprising: determining maximum bottleneck throughput of a communication link between the first communication device and a third communication device, wherein the communication link between the first and third communication devices applies a common access network as between a communication link between the first and second communication devices; determining Round Trip Time (RTT) between the first and second communication devices; transmitting packet by applying User Datagram Protocol (UDP) from the third communication device to the first communication device; measuring packet loss rate associated with the transmitted packet by monitoring sequence number of the packet; and translating measured packet loss rate to Transmission Control Protocol (TCP) throughput according to maximum bottleneck throughput and RTT.

20 Claims, 13 Drawing Sheets

Related U.S. Application Data continuation of application No. 14/907,655, filed as application No. PCT/US2013/053057 on Jul. 31, 2013, now Pat. No. 10,230,610.

(51) Int. Cl.

| | | |
|---|---|---|
| H04L 43/103 | (2022.01) | |
| H04L 41/147 | (2022.01) | |
| H04W 28/02 | (2009.01) | |
| H04L 47/11 | (2022.01) | |
| H04L 47/19 | (2022.01) | |
| H04L 47/263 | (2022.01) | |
| H04L 47/283 | (2022.01) | |
| H04L 47/34 | (2022.01) | |
| H04L 43/04 | (2022.01) | |
| H04L 43/0829 | (2022.01) | |
| H04L 43/087 | (2022.01) | |
| H04L 43/106 | (2022.01) | |
| H04M 3/00 | (2006.01) | |
| H04W 24/08 | (2009.01) | |
| H04W 84/12 | (2009.01) | |

(52) U.S. Cl.
CPC ........ *H04L 43/087* (2013.01); *H04L 43/0841* (2013.01); *H04L 43/0864* (2013.01); *H04L 43/103* (2013.01); *H04L 43/106* (2013.01); *H04L 47/115* (2013.01); *H04L 47/196* (2013.01); *H04L 47/263* (2013.01); *H04L 47/283* (2013.01); *H04L 47/34* (2013.01); *H04M 3/007* (2013.01); *H04W 28/0236* (2013.01); *H04W 24/08* (2013.01); *H04W 84/12* (2013.01)

(56) References Cited

U.S. PATENT DOCUMENTS

| | | | | |
|---|---|---|---|---|
| 6,850,491 | B1* | 2/2005 | Firoiu | H04L 47/745 370/252 |
| 6,909,693 | B1* | 6/2005 | Firoiu | H04L 47/11 370/235 |
| 8,260,922 | B1* | 9/2012 | Aggarwal | H04L 45/24 709/239 |
| 8,441,930 | B2* | 5/2013 | Li | H04L 41/147 370/242 |
| 8,712,883 | B1* | 4/2014 | Yang | H04L 67/1078 375/240 |
| 2002/0089933 | A1* | 7/2002 | Giroux | H04L 49/108 370/414 |
| 2002/0165957 | A1* | 11/2002 | Devoe | H04L 45/123 709/224 |
| 2006/0018257 | A1* | 1/2006 | Seo | H04L 1/0002 370/252 |
| 2006/0018266 | A1* | 1/2006 | Seo | H04L 65/80 370/252 |
| 2006/0240783 | A1* | 10/2006 | Kawada | H04L 1/0002 455/69 |
| 2006/0262723 | A1* | 11/2006 | Velev | H04W 28/0252 370/278 |
| 2007/0217519 | A1* | 9/2007 | Murayama | H04N 19/40 375/E7.161 |
| 2008/0062879 | A1* | 3/2008 | Sivakumar | H04L 69/14 370/235 |
| 2008/0170500 | A1* | 7/2008 | Ito | H04L 47/38 370/235 |
| 2008/0181101 | A1* | 7/2008 | Oh | H04L 1/1887 370/218 |
| 2008/0267068 | A1* | 10/2008 | Lakshman | H04L 47/83 370/235 |
| 2008/0285447 | A1* | 11/2008 | Yamasaki | H04L 47/30 370/231 |
| 2008/0320151 | A1* | 12/2008 | McCanne | H03M 7/30 709/228 |
| 2009/0080336 | A1* | 3/2009 | Zhang | H04L 43/00 370/248 |
| 2009/0122697 | A1* | 5/2009 | Madhyasha | H04L 41/12 370/229 |
| 2009/0268730 | A1* | 10/2009 | Sanjeewa | H04L 1/0002 370/389 |
| 2010/0182947 | A1* | 7/2010 | Jong | H04B 7/18543 370/316 |
| 2010/0185780 | A1* | 7/2010 | Sanjeewa | H04L 65/80 709/233 |
| 2011/0032324 | A1* | 2/2011 | George | H04N 21/4394 348/E7.083 |
| 2011/0032833 | A1* | 2/2011 | Zhang | H04L 45/70 709/239 |
| 2011/0235521 | A1* | 9/2011 | Nishi | H04L 45/123 370/392 |
| 2011/0235525 | A1* | 9/2011 | Nishi | H04L 43/091 370/242 |
| 2011/0249553 | A1* | 10/2011 | Wang | H04L 47/27 370/230 |
| 2012/0087235 | A1* | 4/2012 | Smith | H04L 43/0811 370/221 |
| 2012/0158996 | A1* | 6/2012 | Thaler, III | H04L 43/0864 709/241 |
| 2012/0254457 | A1* | 10/2012 | Condon | H04N 21/2385 709/231 |
| 2013/0039177 | A1* | 2/2013 | Ozawa | H04W 4/18 370/230 |
| 2013/0088955 | A1* | 4/2013 | van den Berg | H04L 47/826 370/230 |
| 2013/0121161 | A1* | 5/2013 | Szabo | H04W 28/02 370/241 |
| 2013/0163455 | A1* | 6/2013 | Oguchi | H04W 24/02 370/252 |
| 2013/0185399 | A1* | 7/2013 | Appleby | H04L 65/70 709/219 |
| 2014/0119184 | A1* | 5/2014 | Harrang | H04L 47/11 370/235 |
| 2014/0126357 | A1* | 5/2014 | Kulkarni | H04L 47/33 370/230 |
| 2014/0185453 | A1* | 7/2014 | Hwang | H04L 41/00 370/236 |
| 2014/0241419 | A1* | 8/2014 | Holmer | H04N 19/154 375/240.03 |
| 2014/0321274 | A1* | 10/2014 | Gahm | H04L 47/2408 370/231 |

* cited by examiner

METHOD AND APPARATUS FOR CONTINUOUS ACCESS NETWORK MONITORING AND PACKET LOSS ESTIMATION

CROSS-REFERENCE TO RELATED APPLICATIONS

This is a continuation of previously filed co-pending application Ser. No. 16/192,442 entitled "METHOD AND APPARATUS FOR CONTINUOUS ACCESS NETWORK MONITORING AND PACKET LOSS ESTIMATION," naming as inventors, Chan-Soo Hwang, Jeonghun Noh, and Parimal Parag, and filed Nov. 15, 2018, which is a continuation of previously filed co-pending application Ser. No. 14/907,655, entitled, "METHOD AND APPARATUS FOR CONTINUOUS ACCESS NETWORK MONITORING AND PACKET LOSS ESTIMATION," naming as inventors, Chan-Soo Hwang, Jeonghun Noh, and Parimal Parag, and filed Jan. 26, 2016, which is a 371 National Phase of International PCT Application No. PCT/US2013/053057, entitled "METHOD AND APPARATUS FOR CONTINUOUS ACCESS NETWORK MONITORING AND PACKET LOSS ESTIMATION," naming as inventors, Chan-Soo Hwang, Jeonghun Noh, and Parimal Parag, and filed Jul. 31, 2013, which applications are hereby incorporated herein by reference in their entireties.

BACKGROUND

Most network performance problems occur in access network. One reason for performance variations (which is a type of performance problem) in access network is that the access network is a less controlled environment. Access networks are susceptible to radio/propagation environment changes.

For example, a Digital Subscriber Line (DSL) is susceptible to impulse noise that may be caused by electric equipments (e.g., florescent light) i.e., noise appears on the DSL when light is on causing performance of the DSL to degrade. Impulse noise in DSL may also be synchronous with electricity cycle. For example, impulse noise is observed in a DSL every 8.3 ms when impulse noise has a frequency of 120 Hz and electricity is operating with a standard 60 Hz.

Wi-Fi is another type of access network which is susceptible to radio/propagation environment changes. For example, interference in Wi-Fi may be caused when neighboring Wi-Fi users operate their Wi-Fi equipment using the same frequency. Interference patterns in Wi-Fi may be intermittent. For example, when users with their Wi-Fi enabled portable devices are close to a victim Wi-Fi device, performance of the victim Wi-Fi device may degrade due to interferences from Wi-Fi enabled portable devices. Wi-Fi enabled portable devices may physically move which makes the task of correcting performance degradation in victim Wi-Fi challenging. Accordingly, access networks (e.g., Wi-Fi, DSL, etc.) may require continuous (e.g., 24/7) performance monitoring to have the ability to correct for performance degradation.

However, there are limitations to continuously monitoring of an access network. For example, DSLAM (DSL Access Multiplexer) and/or CPE (Customer Premises Equipment) modem is capable of continuously monitoring PHY (Physical) Layer performance, but DSLAM data is only available to network providers who are reluctant to share data. There is also no known standard interface to retrieve CPE data. Furthermore, there is no known direct relation between user experience (i.e., user of the access network) and PHY performance metric (e.g., data rate, error rate, etc.).

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
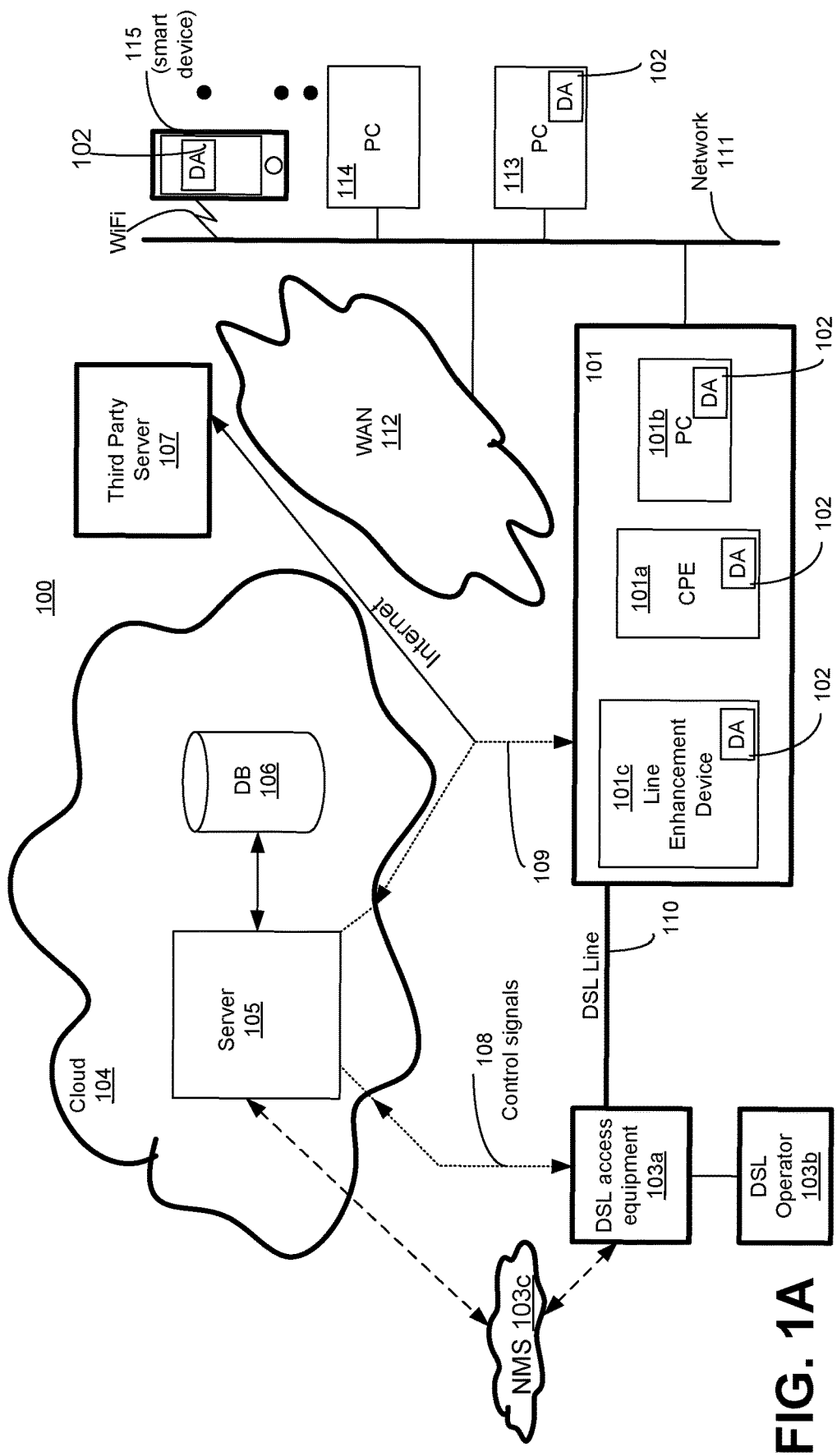
FIG. 1A is a communication network with some or all communication devices having a downloadable agent to assist with continuous access network monitoring, according to one embodiment of the disclosure.

The embodiments describe a method and apparatus for continuous access network monitoring and pack loss estimation. The embodiments address the limitations discussed in the background section by estimating TCP (Transmission Control Protocol) throughput using UDP (User Datagram Protocol) packet loss in a platform independent manner. TCP and UDP are the transport layer protocols in the Internet protocol stack, thus independent from underlying physical layer.

In one embodiment, the apparatus and method continuously monitors packet loss rate at the transport layer with minimum amount of packet probing. In one embodiment, the apparatus and method interprets packet loss rate to performance metrics that represent user experience. In one embodiment, the apparatus and method diagnoses problems in the link layer that cause performance degradation by analyzing the transport layer packet loss and jitter.

In one embodiment, TCP throughput is estimated based on the packet loss probability in the access network. Most often, packet loss is most severe at the access network. It is also known that packet loss probability can be impacted severely by non-stationary impulse noise. In one embodiment, an active probing scheme is used that continuously estimates packet loss probability by sending UDP packets. In one embodiment, the probing scheme leads to an unbiased estimator that is also minimum variance estimator. In one embodiment, this probing scheme adapts to the presence or absence of impulse noise. In one embodiment, a detection scheme is used to identify presence of impulse noise that can trigger the adaptation.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" generally refers to two or more elements which are in direct contact (physically, electrically, magnetically, electromagnetically, optically, etc.). The term "coupled" generally may also refer to two or more elements that are not in direct contact with each other, but still cooperate or interact with each other.

Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The terms "substantially," "close," "approximately," "near," and "about," generally refer to being within +/−20% of a target value.

FIG. 1A is a communication network 100 with some or all communication devices having a downloadable agent to assist with continuous access network monitoring, according to one embodiment of the disclosure. In one embodiment, communication network 100 comprises a local network 101 (e.g., a network at home) having Customer Premises Equipment (CPE) 101a and a personal computer (PC) 101b. In one embodiment, CPE 101a is a DSL modem. In one embodiment, LAN 101 optionally comprises a line enhancement device 101c which is any device coupled to DSL line 110 that improves the quality or performance on DSL line 110. The term "performance" generally refers to network throughput (e.g., TCP/UDP), latency, jitter, connectivity, error rates, power consumption, transmit power, etc. Improving performance of the communication system includes increasing throughput, reducing error rate and/or latency, improving (i.e., reducing) jitter, reducing power consumption, etc. for the communicating system.

In one embodiment, line enhancement device 101c is a standalone device. In another embodiment, line enhancement device 101c is integrated with CPE 101a. In one embodiment, one or more devices of LAN (e.g., home LAN) 101 are operable to communicate with server 105 via Internet 109 (via wired or wireless connections). The term "Local Area Network" (LAN) here generally refers to a computer or communication network that interconnects computers or communication devices in a limited area such as a home, school, computer laboratory, or office building using network media.

In one embodiment, communication network 100 comprises a server 105 coupled to a database 106. In one embodiment, server 105 and/or the database 106 reside in a cloud 104. The term "cloud" generally refers to cloud computing which is the delivery of computing and storage capacity as a service to a community of end-recipients. The term "cloud" is indicated with use of a cloud-shaped symbol 104 as an abstraction for the complex infrastructure it contains in system diagrams. Cloud computing entrusts services with a user's data, software and computation over a network. In one embodiment, server 105 resides in cloud 104 and is operable to perform complex analysis (e.g., statistical) based on information collected from other communication devices via the Internet.

In one embodiment, communication network 100 comprises DSL access equipment 103a (also called a DSL access network, or DSL node) which is operable to communicate with CPE 101a via DSL line 110. In one embodiment, DSL access equipment 103a comprises a DSLAM (digital subscriber line access multiplexer). In one embodiment, DSL access equipment 103a comprises a CO (central office). In one embodiment, DSL access equipment 103a receives control signals 108 from server 105 that instruct a DSL operator 103b about ways to improve performance of its customers e.g., CPE 101a, etc. In one embodiment, DSL operator 103b can communicate with other devices (or communication units) via WAN 112. The term "Wide Area Network" (WAN) generally refers to a telecommunication network that covers a broad area (i.e., any network that links across metropolitan, regional, or national boundaries) compared to the limited area covered by a LAN.

In one embodiment, control signals 108 include at least one or more of signals or commands related to: power, for example, transmission power, spectrum control, for example, Power Spectral Density (PSD) mask, margin, data rate, latency/delay, and coding, for example, Forward Error Correction (FEC) coding.

In one embodiment, server 105 is operable to access external communication devices (external to cloud 104) through cloud-based applications via a web browser or mobile application. In the embodiments, DA (downloadable agent) 102 is operable to communicate with resources (e.g., server 105, database 106) of cloud 104. In one embodiment, DA 102 may be downloaded from any platform e.g., a disk, memory stick, web browser, web server, etc. In one embodiment, DA 102 associated with a communication device executes on an Internet browser (e.g., Safari®, Netscape®, FireFox®, Internet Explorer®, etc.). In one embodiment, DA 102 associated with the communication device is accessible remotely via the Internet.

In one embodiment, DA 102 is operable to execute on multiple computing platforms with different operating systems. For example, DA 102 may operate on operating systems including Android, Berkley Software Distribution (BSD), iOS, GNU/Linux, Apple Mac OS X, Microsoft Windows, Windows Phone, and IBM z/OS. In one embodiment, DA 102 is operable to execute in a virtual machine (VM). A VM is a software implementation of a machine (e.g., a computer) that executes programs like a physical machine. Examples of virtual machines include a Java Virtual Machine and the previously mentioned operating systems executing in VMWare, Virtual Box or the like. In one embodiment, DA 102 may receive automatic updates to keep the application up to date with the latest features.

In one embodiment, DA 102 is dynamically downloaded to the computing device. The term "dynamically" generally refers to automatic action. The term "dynamically" also refers to downloading of an agent by a computing device on-demand and prior to use of an agent. A dynamically downloaded agent may be deleted from the computing device following the use of that agent.

In one embodiment, communication network 100 comprises a wireless device, for example, a smart device 115 (e.g., smart phone, tablet, etc.) with a DA 102. In one embodiment, DA 102 is executable on a computing device (e.g., 101*a-c*, 115, 113, 114) coupled to network 111.

In one embodiment, the computing device is one of: computer, laptop/desktop, smart phone, tablet computing device; an access point (AP); a base station; a wireless smart phone device; a wireless LAN device; an access gateway; a router, a performance enhancement device; a DSL CPE modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, server 105 is operable to perform a method for estimating throughput between first (e.g., 101*b*) and second communication devices (e.g., third party server 107). In one embodiment, DA 102 at client side (e.g., 302*a* and 305*a* of FIG. 3) is operable to method for estimating throughput. In one embodiment, DA 102 of a communication device provides time series information e.g., RTT, R, packet loss rate, to server 105 for server 105 to perform the method for estimating throughput between first (e.g., 101*b*) and second communication devices (e.g., third party server 107).

Examples of third party server 107 include, server hosted by a content provider e.g., Netflix®, Yahoo®, etc. In one embodiment, server 105 is operable to perform a method for adaptive probing to estimate packet loss probability. The term "probing" generally refers to testing of a communication network by sending test pattern/data over the network from one communication device to another communication device, and then measuring the response from the sent test pattern.

Figure 1B:
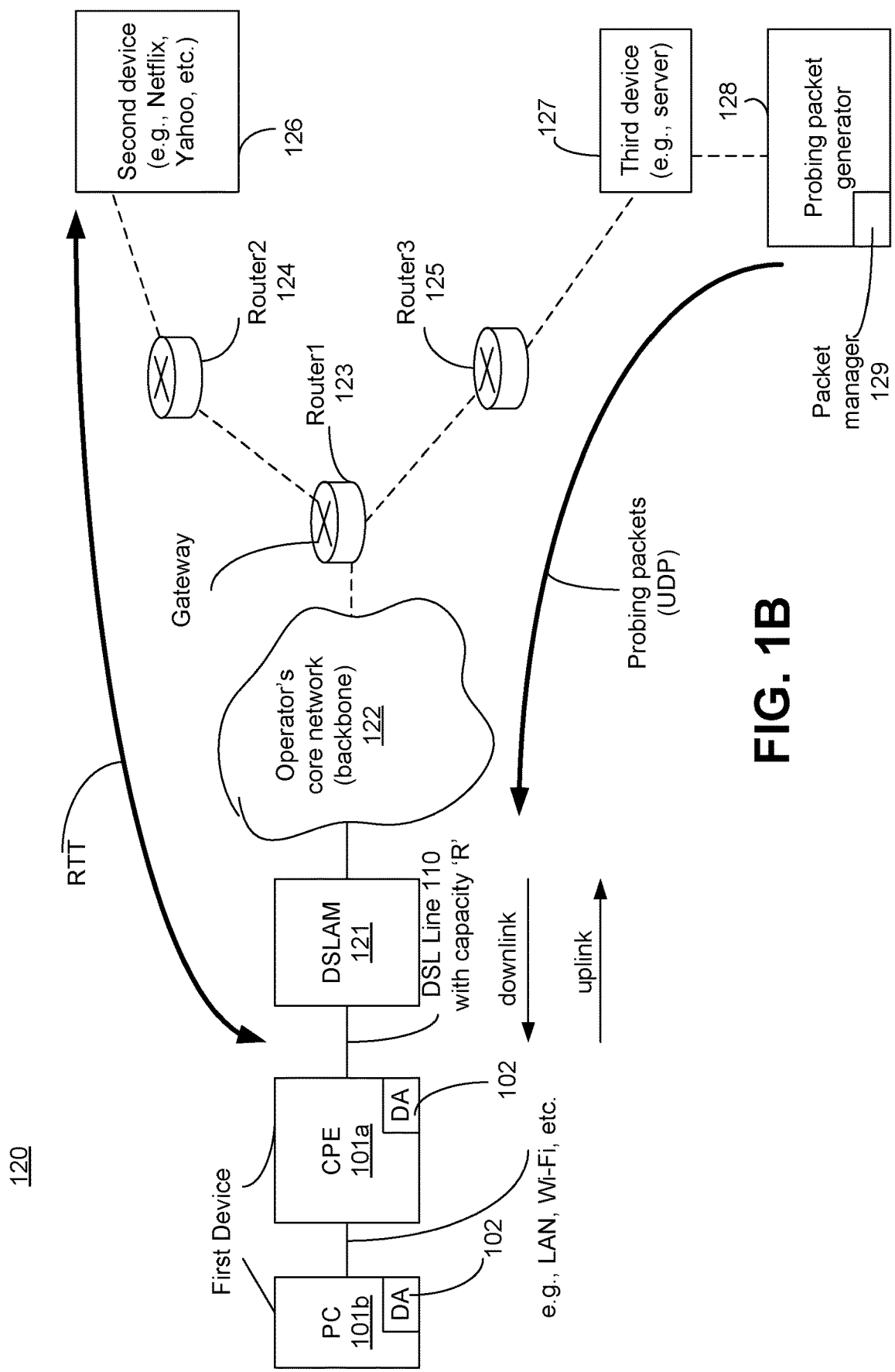
FIG. 1B is a communication network showing first, second, and third communication devices used for continuous access network monitoring and packet loss estimation, according to one embodiment of the disclosure.

FIG. 1B is a communication network 120 showing first, second, and third communication devices used for continuous access network monitoring and packet lost estimation, according to one embodiment of the disclosure. It is pointed out that those elements of FIG. 1B having the same reference numbers (or names) as the elements of any other figure can operate or function in any manner similar to that described, but are not limited to such.

In one embodiment, communication network 120 comprises part or all of home network 101 having PC 101*b* and CPE 101*a*. In this embodiment, PC 101*b* and/or CPE 101*a* form the first communication device. As discussed with reference to FIG. 1A, PC 101*b* and CPE 101*a* have their corresponding downloadable agents (DAs) 102. In one embodiment, CPE 101*a* communicates with PC 101*b* Internet e.g., through LAN or Wi-Fi. In one embodiment, CPE 101*a* is coupled to DSLAM 121 (same as 103*a*). In one embodiment, communication network 120 comprises second communication device 126 (i.e., a third party server e.g., Netflix server, Yahoo server, etc.), and third communication device 127 (e.g., server 105).

Figure 9:
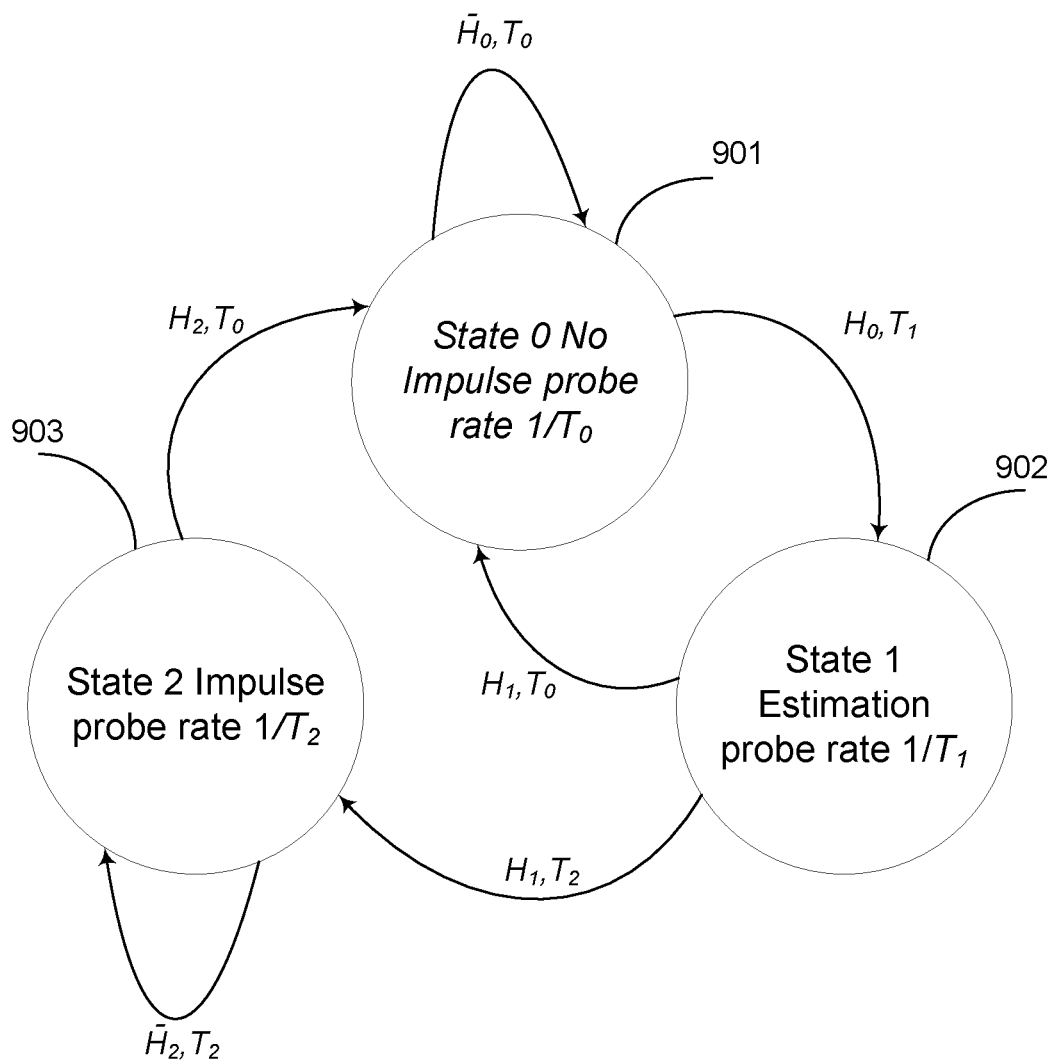
FIG. 9 is a state diagram for packet loss estimation, according to one embodiment of the disclosure.
Figure 10:
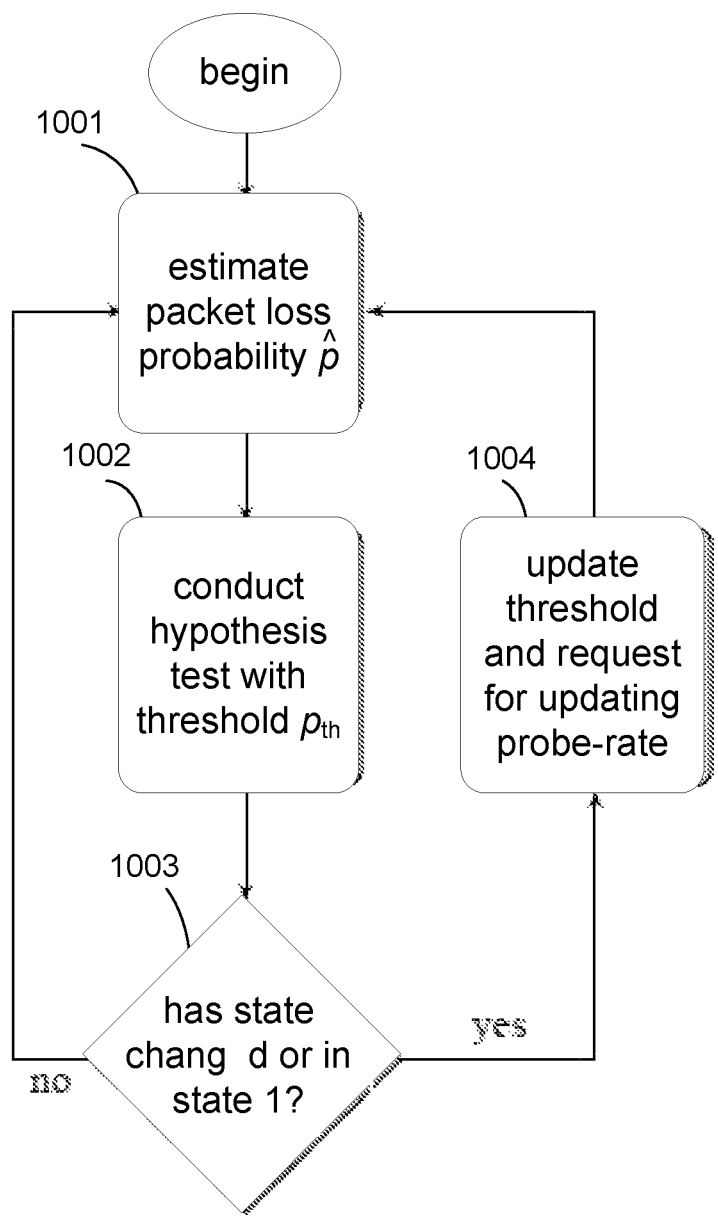
FIG. 10 is a flowchart for client thread conducting packet loss estimation, threshold based hypothesis test, and server notification, according to one embodiment of the disclosure.

In one embodiment, communication network 120 comprises a probing packet generator 128 coupled to third communication device 127. In one embodiment, probing packet generator 128 includes a packet manager 129. In one embodiment, methods of FIG. 9 and FIG. 10 are executed by packet manager 129. Referring back to FIG. 1B, in one embodiment, first communication device (i.e., PC 101*b* and/or CPE 101*a*) is coupled to second and third communication devices 126 and 127 via operator's core network 122 or the public network (e.g., the Internet), gateway (Router 1) 123, Router 2 124, and Router 3 125. While the embodiments show three routers, any number of routers may be used to communicate between first, second, and third communication devices.

In one embodiment, throughput of DSL line 110 between first communication device (i.e., PC 101*b* and/or CPE 101*a*) and second communication device 126 is estimated by determining maximum bottleneck throughput of a communication link between the first communication device and third communication device 127, wherein the communication link between the first and third communication devices applies a common access network.

In one embodiment, the method of estimating throughput of DSL line 110 between first communication device (i.e., PC 101*b* and/or CPE 101*a*) and second communication device 126 further comprises determining RTT between the first (i.e., PCT 101*b* and/or CPE 101*a*) and second communication devices 126. In one embodiment, the method of determining the RTT comprises executing a ping command. In one embodiment, the method of determining the RTT comprises: identifying a list of servers frequented by a user of the first communication device; and measuring the RTT for each of the identified list of servers.

In one embodiment, the method of estimating throughput of DSL line 110 further comprises transmitting UDP packets from the first communication device to the third communication device. In this example, throughput associated with uplink is estimated. In one embodiment, method of estimating throughput of DSL line 110 comprises transmitting a packet by applying UDP from the third communication device to the first communication device. In this example, throughput associated with downlink is estimated. In one embodiment, probing packet generator 128 and packet manager 129 are included in DA 102 (of any of the devices) to compute uplink throughput. In one embodiment, probing packet generator 128 generates the UDP packets.

In one embodiment, the method of estimating throughput of DSL line 110 further comprises measuring packet loss rate associated with the transmitted packet by monitoring sequence number of the packet; and translating measured packet loss rate to TCP throughput according to maximum bottleneck throughput and RTT. In one embodiment, the packet loss rate is associated with packets in a transport layer. In one embodiment, the method of measuring packet loss rate comprises: monitoring one or more of network load, access network layer error count, or physical layer noise counter; and providing a confidence of the packet loss rate measurement according to results of the monitoring. In one embodiment, the method of measuring packet loss rate comprises: comparing upstream and downstream packet loss rates to determine packet loss rate associated with packets in the common access network.

In one embodiment, the method of estimating throughput of DSL line 110 further comprises translating measured packed loss rate to TCP throughput according to maximum bottleneck throughput and RTT. In one embodiment, the method of translating measured packet loss rate to TCP throughput comprises: reading the confidence of the packet loss rate measurement; outputting possible range of TCP throughput corresponding to the confidence of packet loss rate measurement; and outputting measurement failure message if the confidence is lower than a predetermined threshold.

For example, suppose that network load is near 100%. Then, the packet loss may be caused by active queue management at access network aggregation point (such as DSLAM 121). In this exemplary case, packet loss measurement is not used to estimate maximum TCP throughput because packet loss due to queuing and access network are hard to distinguish. Continuing with the example, assume that the network load is close to 100% but access network error counter or physical layer noise counter detects problems in the access network quality. In this exemplary case, measured packet loss rate can be used to compute the maximum access network TCP throughput (although this may be slightly under-estimation of the true throughput).

In one embodiment, the method of estimating throughput of DSL line 110 further comprises measuring packet arrival jitter associate with the transmitted packet by monitoring the arrival time stamps. In one embodiment, the method of estimating throughput of DSL line 110 further comprises attributing a low throughput event to packet loss associated with the DSL link 110 when packets are lost consecutively for more than a predetermined time.

While the embodiment of FIG. 1B is illustrated with a first device being a CPE 101a and/or a PC 101b, second device being a third party server, and 3rd device being server 105, the first, second, and third communication devices can be any one of: an access point (AP); a base station; a wireless smartphone device; a wireless LAN device; an access gateway; a router, a DSL performance enhancement device; a DSL CPE modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; an Ethernet connected network switch; and a server.

Figure 2:
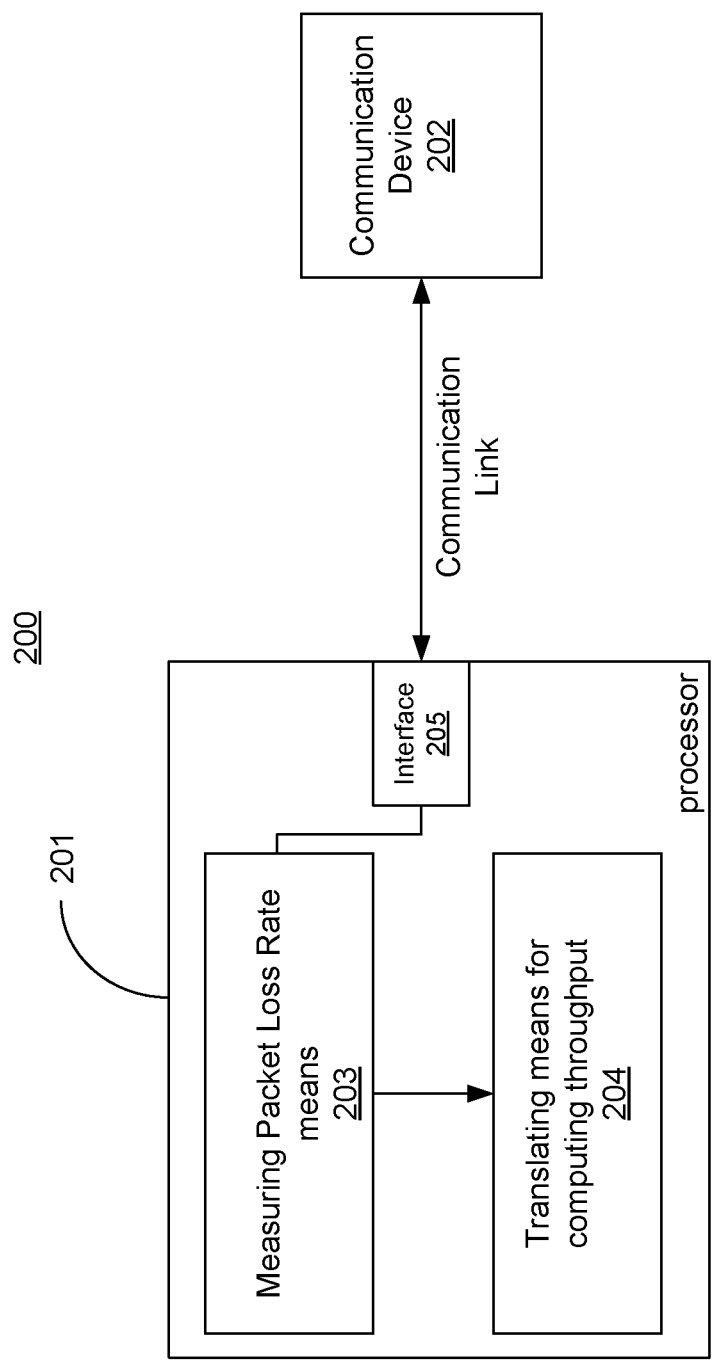
FIG. 2 is a processor operable to translate measured packet loss rate to Transmission Control Protocol (TCP) throughput, according to one embodiment of the disclosure.

FIG. 2 is a system 200 with a processor operable to translate measured packet loss rate to TCP throughput, according to one embodiment of the disclosure. It is pointed out that those elements of FIG. 2 having the same reference numbers (or names) as the elements of any other figure can operate or function in any manner similar to that described, but are not limited to such.

In this exemplary embodiment, system 200 comprises processor 201 coupled to a communication device 202 via a communication link (wired or wireless). Processor 201 may be a processor coupled to the access network. For example, processor 201 may be part of Wi-Fi AP, part of DSL system, etc. In one embodiment, processor 201 has logic for continuously monitoring packet loss rate at the transport layer with minimum amount of packet probing via interface 205. In one embodiment, processor 201 comprises logic 203 for measuring packet loss rate and translating means 204 for computing TCP throughput.

In one embodiment, processor 201 measures TCP throughput of a communication link (e.g., DSL Link 110) without saturating the network because doing so may interfere with user's network usage experience. UDP probing rate (e.g., UDP packet generation rate) is adaptive to environmental changes (e.g., radio/propagation environment changes discussed in the background section). In one embodiment, processor 201 measures or interprets TCP throughput by probing UDP packets sent from a third-party server (e.g., 126) to the processor 201 (i.e. client). For example, if user uses Netflix® for watching media content, then the third-party server is the server hosted or used by Netflix® for providing the media content.

In one embodiment, processor 201 interprets (or translates) packet loss rate to performance metrics that represent user experience. In one embodiment, bottleneck throughput is occasionally measured. In one embodiment, RTT (Round Trip Time) is measured for the services that are frequented by the user. In such an embodiment, RTT is used to compute time-series of TCP throughput and UDP packet loss rate for the services. TCP throughput estimation may be a time-series (sequence) because RTT and packet loss rate are sequences in time.

In one embodiment, logic in processor 201 is operable to diagnose link layer problem(s) by analyzing transport layer packet loss and jitter. For example, logic in processor 201 can identify where the problem occurred (Wi-Fi versus DSL), detect impulse noise problems and stability of the DSL, detect interference problem of Wi-Fi, etc.

In one embodiment, TCP throughput estimation via UDP Packet generation and monitoring is performed by measuring bottleneck throughput a' a few times over a long duration of time. For example, whenever CPE 101a retrains, maximum bottleneck throughput (i.e., 'R') is measured by processor 201. In one embodiment, known tools such as speedtest.net may be used to measure 'R.' 'R' may be measured a few times over a day, for example.

In one embodiment, RTT is measured by processor 201 with reference to a third-party server (e.g., 126). In one embodiment, a list of servers is obtained from the user for measuring RTT. In one embodiment, a list of servers is generated by monitoring user traffic to identify frequently visited websites (i.e., servers). In one embodiment, RTT is measured for each server on the list. In one embodiment, RTT is measured using "ping" or "http-ping."

In one embodiment, packet loss rate (i.e., packet loss probability 'p') is measured by processor 201. In this embodiment, low traffic (i.e., low volume of traffic) is generated by server (e.g., server 127) using UDP. Example of low traffic is traffic which is around 2% of peak speed of user's broadband link. In one embodiment, packet loss is measured by monitoring sequence number of UDP. UDP has a header and user data. In one embodiment, as part of the user payload, packet sequence numbers are assigned to track the packet.

In one embodiment, upstream (or uplink) and/or downstream (or downlink) packet loss rate is compared to determine DSL link error rate. For example, downlink packet loss rate is determined from DSLAM (and the Internet) to CPE. Referring to FIG. 1B, downstream link is a link from server 127 to CPE 101a, and upstream link is a link from CPE 101a to server 127. In one embodiment, downstream link is a link from DSLAM 121 to CPE 101a, and upstream link is a link from CPE 101a to DSLAM 121. In one embodiment, to measure downstream pack loss rate, server 127 sends UDP packets which are received by DA 102 of CPE 101a. In one embodiment, to measure upstream packet loss rate, DA 102 of CPE 101a sends UDP packets which are received by server 127. In one embodiment, the second device is accessed only when measuring RTT.

Referring back to FIG. 2, in one embodiment, packet loss rate 'p' is translated to TCP throughput by using measured maximum bottleneck throughput 'R,' measured RTT, and measured packet loss rate 'p.' In one embodiment, time-series of TCP throughput is computed as:

$$T = \min\left(\frac{MSS}{RTT}\sqrt{\frac{3}{2p}}, R\right)$$

where "MSS" is a scalar quantity indicating the maximum segment size. In one embodiment, segment size refers to size of the internet datagram excluding the IP header. In most of applications, maximum segment size is about 1500 Bytes.

Figure 3:
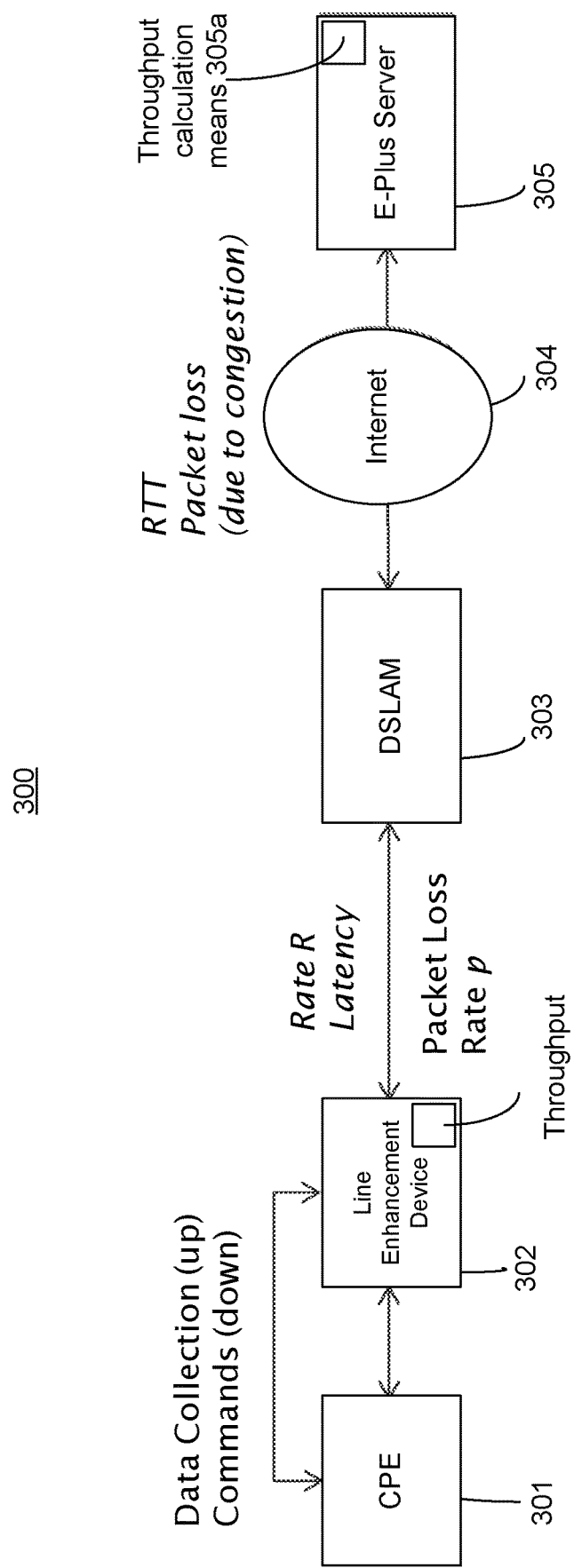
FIG. 3 is a high level system to translate measured packet loss rate to TCP throughput, according to one embodiment of the disclosure.

FIG. 3 is a system 300 to translate measured packet loss rate to TCP throughput, according to one embodiment of the disclosure. It is pointed out that those elements of FIG. 3 having the same reference numbers (or names) as the elements of any other figure can operate or function in any manner similar to that described, but are not limited to such.

System 300 is a subset of system 100. In one embodiment, system 300 comprises CPE 301 (e.g., CPE 101a) coupled to a line enhancement device 302 (same as 101c). In one embodiment, TCP throughput calculation means 302a are embedded in Line Enhancement Device 302 (e.g., 101c). In one embodiment, TCP throughput calculation means 302a are embedded in CPE 301. In one embodiment, system 300 further comprises DSLAM 303 (e.g., 103a) which allows user to connect to a server 305 (e.g., 105) via Internet 304. In one embodiment, TCP throughput calculation means 305a are embedded in server 305.

Figure 4A:
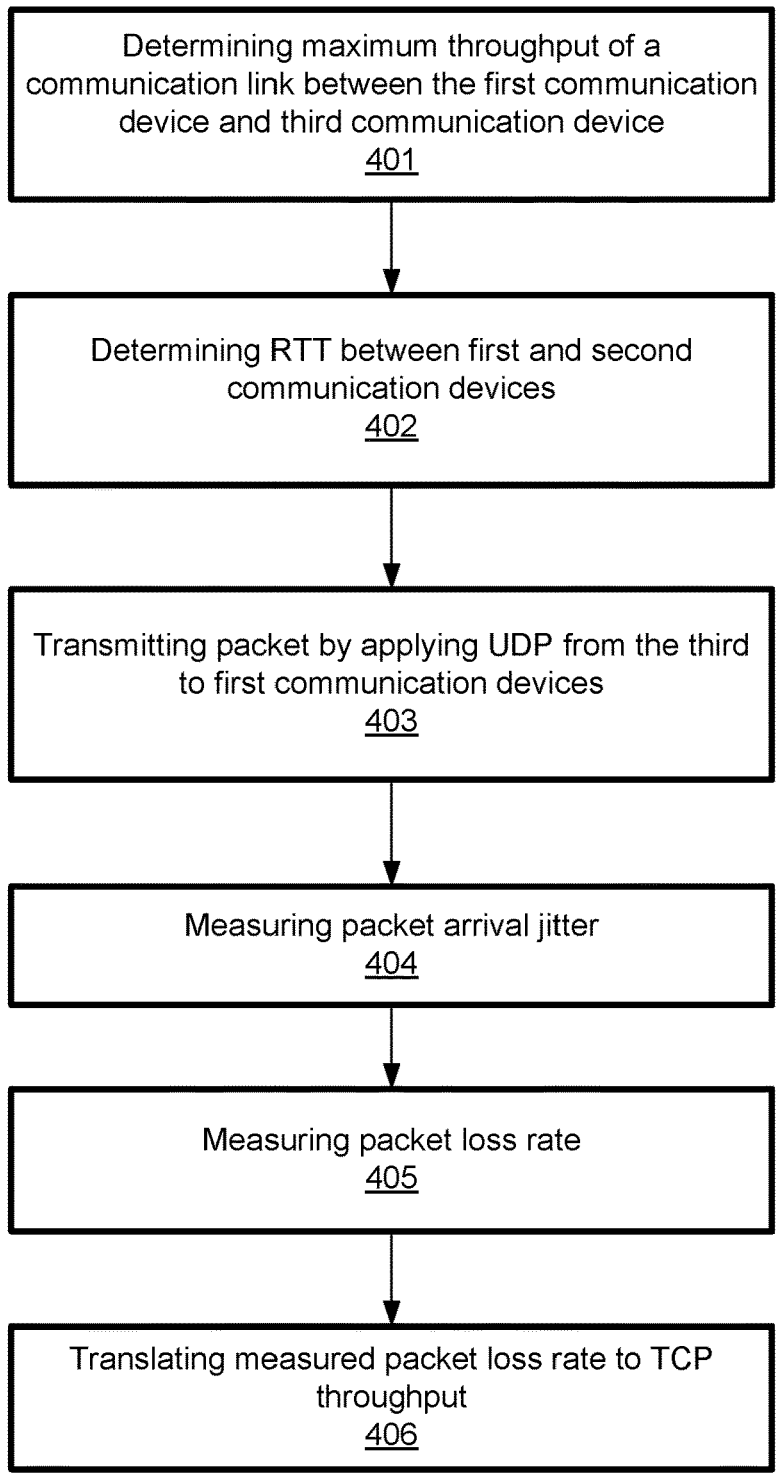
FIG. 4A is a flowchart of a method for estimating throughput between first and second communication devices, according to one embodiment of the disclosure.

FIG. 4A is a flowchart 400 of a method for estimating throughput between first and second communication devices, according to one embodiment of the disclosure. Although the blocks in the flowcharts with reference to FIG. 4A are shown in a particular order, the order of the actions can be modified. Thus, the illustrated embodiments can be performed in a different order, and some actions/blocks may be performed in parallel. Some of the blocks and/or operations listed in FIG. 4A are optional in accordance with certain embodiments. The numbering of the blocks presented is for the sake of clarity and is not intended to prescribe an order of operations in which the various blocks must occur. Additionally, operations from the various flows may be utilized in a variety of combinations.

It is pointed out that those elements of FIG. 4A having the same reference numbers (or names) as the elements of any other figure can operate or function in any manner similar to that described, but are not limited to such.

At block 401, maximum bottleneck throughput a' is determined of a communication link between the first communication device and a third communication device, wherein the communication link between the first and third communication devices applies a common access network as between a communication link between the first and second communication devices.

At block 402, RTT is determined or measured between the first and second communication devices. In one embodiment, block 402 is performed by determining the RTT comprises executing a ping command. For example, ping, http-ping, can be used. In one embodiment, block 402 is performed by identifying a list of servers frequented by a user of the first communication device; and measuring the RTT for each of the identified list of servers. In one embodiment, TCP throughput of the links between the client and the listed servers is then estimated.

At block 403, packet is transmitted (by applying UDP) from the third communication device to the first communication device i.e., the first communication device (e.g., 101a) receives the packet sent by third communication device (e.g., 126). At block 404, packet arrival jitter associated with the transmitted packet is measured by monitoring the arrival time stamps. At block 405, packet loss rate is measured which is associated with the transmitted packet by monitoring sequence number of the packet. In one embodiment, block 405 is performed by comparing upstream and downstream packet loss rates to determine packet loss rate associated with packets in the common access network.

At 406, measured packet loss rate is translated to TCP throughput according to maximum bottleneck throughput and RTT using, for example, the following formula:

$$T = \min\left(\frac{MSS}{RTT}\sqrt{\frac{3}{2p}}, R\right)$$

For example, to measure throughput between first communication device (e.g., CPE) and second communication device (e.g., Netflix® server), RTT is measured between first communication device and second communication device. Continuing with the example, maximum bottleneck throughput a' and packet loss rate (and this packet loss probability 'p') is measured between first communication device and third communication device (e.g., server 105). In this example, communication links from first communication device to second and third communication devices is the same access network (e.g., DSL/Wi-Fi link). In one embodiment, after TCP throughput is determined, diagnostics is performed. For example, packet loss/delay jitter is attributed to instability of DSL/Wi-Fi Link. Some embodiments allow for link diagnostics by analyzing delay jitter and packet loss pattern to locate the root cause of packet loss when the end user is connected to DSL via Wi-Fi.

Figure 4B:
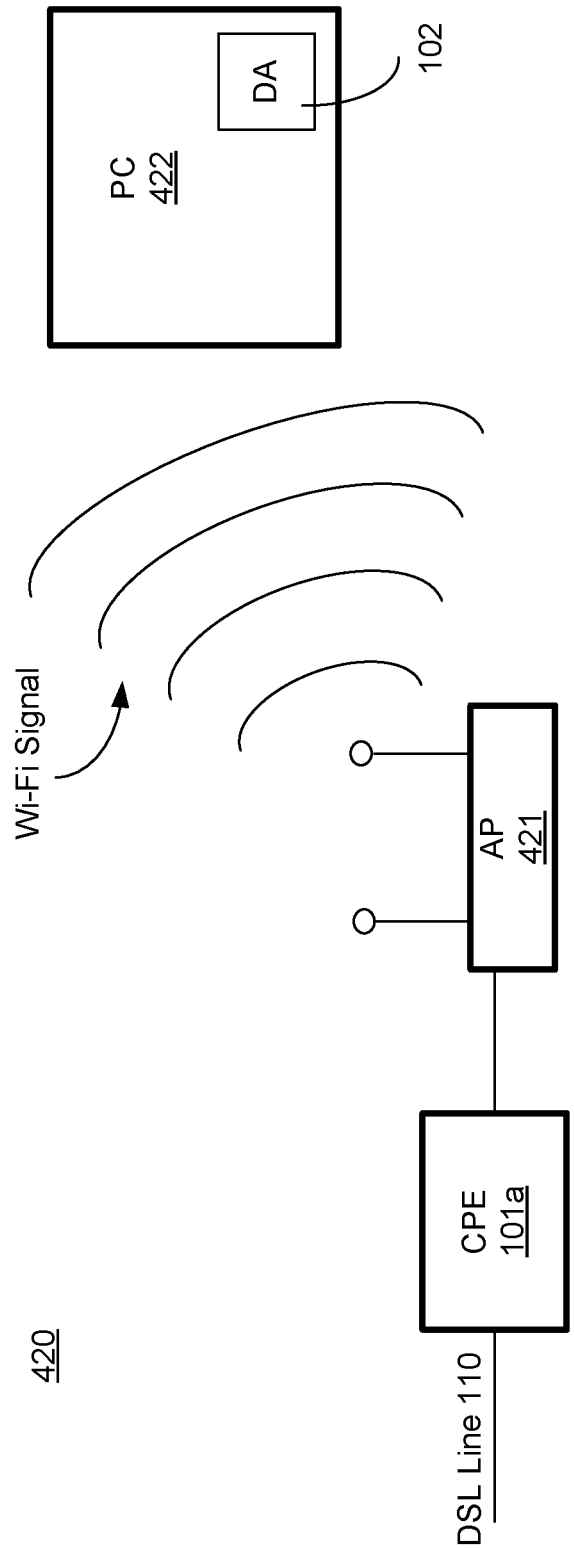
FIG. 4B illustrates a wireless system for throughput measurement with end client coupled to a Wi-Fi access point (AP) and a Customer Premises Equipment (CPE), according to one embodiment of the disclosure.

FIG. 4B illustrates a wireless system 420 with end client coupled to a Wi-Fi access point (AP) and a CPE, according to one embodiment of the disclosure. It is pointed out that those elements of FIG. 4B having the same reference numbers (or names) as the elements of any other figure can operate or function in any manner similar to that described, but are not limited to such.

In this embodiment, wireless system 420 comprises CPE 101a which is coupled to DSL line 110 and AP 421. In one embodiment, AP 421 communicates with another communication device e.g., PC 422 (which includes DA 102). In one embodiment, AP 421 includes a packet queue used for transmission and retransmission of packets. When an end client device is connected to a Wi-Fi AP 42, which is then connected to CPE 101a in the same physical box or via a wire, measurement application(s) executing on the client device may be affected by the performance of the Wi-Fi wireless connection. Inter-arrival time between adjacent packets and/or packet loss information may be used to localize networking issues.

Since a wireless connection is subject to higher transmission errors and interference, transmission errors take place more frequently associated access networks. Thus, unlike DSL, Wi-Fi may provide retransmissions for packets that did not arrive at the receiver without errors. The extra delay caused by retransmission leads to jitter in packet arrival time, which can be used to detect congestion and/or contention (e.g., due to many Wi-Fi users or high volume of continuous traffic in the nearby environment) on the Wi-Fi.

The maximum additional delay caused by a series of retransmissions greatly varies depending on the environment, but usually it is bounded by 100 ms (in 802.11x, maximum retransmission count for a full-size packet (around 1460B) is set to 7).

On the other hand, though DSL also offers a couple of retransmission based technologies such as PhyR and G.Inp, those technologies are not well deployed and still the majority of the deployed DSL lines do not employ retransmissions when errors occur. Thus, jitter incurred on the DSL line can be ignored. Assuming the network jitter has been consistent, and gradually or suddenly starts to vary, then it is very likely that the Wi-Fi channel is congested. Although Wi-Fi provides retransmission for corrupted packets, there is a limit on the number of retransmission attempts.

The length of UDP buffer shared by every client located at the AP is finite. For example, when the AP continues to back off due to congestion, the UDP buffer may overflow due to the incoming traffic flow caused by the sender that is not aware of the congestion at the receiver side. Continuing with the example, bursty packet losses may be observed by the measurement application. This packet loss pattern is rarely seen on the DSL line, where impulsive noises are pretty short, and it is highly unlikely that consecutive packets are destroyed by impulsive noises.

In one embodiment, packet loss rate is associated with packets in a transport layer. In one embodiment, the communication link comprises a DSL link and a Wi-Fi link. In one embodiment, the method further comprises attributing a low throughput event to problems in the Wi-Fi link when both packet loss and packet arrival jitter are detected. In one embodiment, the communication link is a DSL link.

Figure 5:
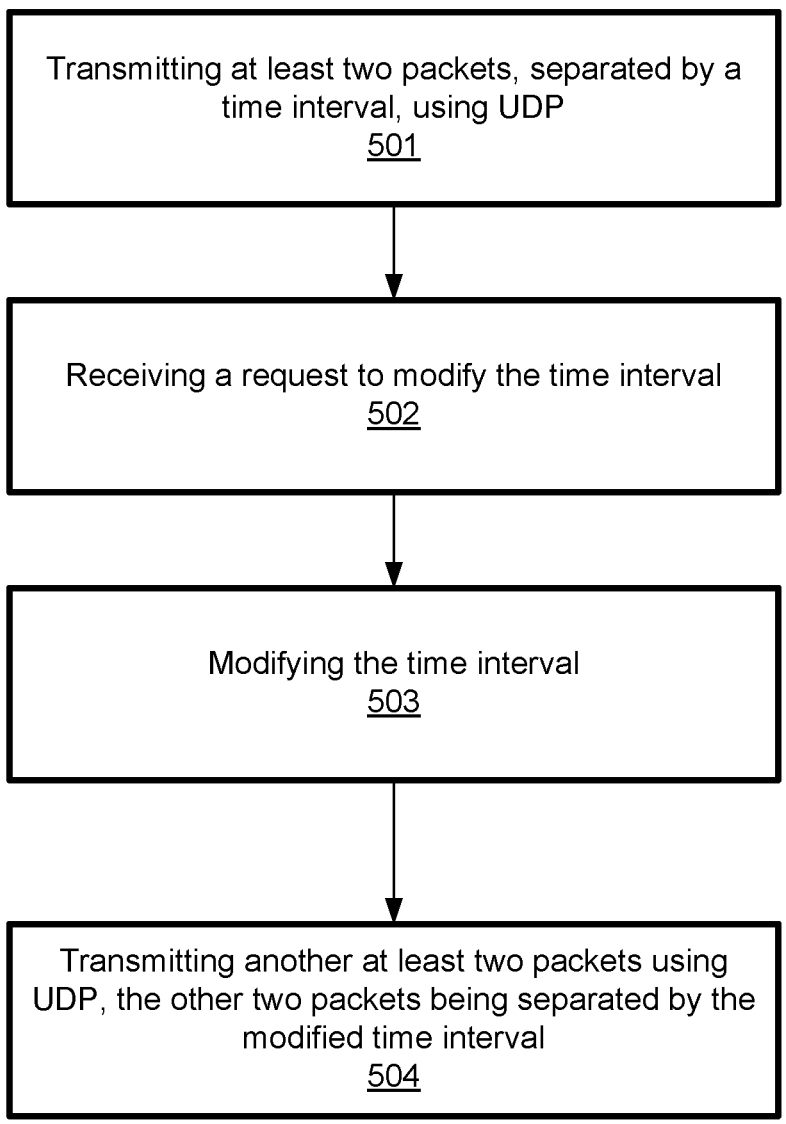
FIG. 5 is a flowchart of a method for adaptive probing to estimate packet loss probability, according to one embodiment of the disclosure.

FIG. 5 is a flowchart 500 of a method for adaptive probing to estimate packet loss probability, according to one embodiment of the disclosure. It is pointed out that those elements of FIG. 5 having the same reference numbers (or names) as the elements of any other figure can operate or function in any manner similar to that described, but are not limited to such. In one embodiment, flowchart 500 is performed by probing packet generator 128 having packet manager 129. In one embodiment, for throughput measurement during uplink, flowchart 500 is performed by DA CPE 101a or PC 101b.

Although the blocks in the flowcharts with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur. Additionally, operations from the various flows may be utilized in a variety of combinations.

In one embodiment, flowchart 500 assists with quantifying the impact of impulse noise at the access point of the Internet. One of the metrics of interest may be the maximum TCP throughput that can be supported on this communication link. Further, access point is usually the bottleneck communication link with the most dominant packet loss. In one embodiment, flowchart 500 estimates the packet loss probability at this link. One technical effect of the embodiment is that achievable throughput on this link can be bounded. Flowchart 500 provides insight in how the impulse noise impacts the instantaneous throughput of the link i.e., does the packet loss probability increase significantly during persisting impulse events.

The occurrence of impulse is a non-stationary event. In one embodiment, the impact of the impulse is detected by continuously monitoring the link. If packets are continuously sent on the channel, exact estimate of the packet loss probability can be achieved. However, this would render the communication channel useless for any practical usage. The embodiments provide a least intrusive method to the channel for estimating packet loss probability by minimizing the average time occupied by probing packets, while maintaining an acceptable error in the estimate of the packet loss probabilities.

The embodiment reduces monitoring overhead to minimize interference with regular communication on the link. In one embodiment, adaptive probing scheme probe rate is adapted according to presence or absence of impulses on the link. In one embodiment, link is probed slowly in the absence of impulse to reduce impact (e.g., infrequent probing) to the channel. In one embodiment, probe rate is increased during impulse events for accurate estimation of packet loss probability.

The embodiment of FIG. 5 describes adaptive probing scheme to capture the impulse related loss probability (with reduced overhead) in the DSL access link. In other embodiments, other types of links may be used.

At block 501, a server machine transmits at least two packets using UDP, the at least two packets being separated by a time interval with mean 'T.' At block 502, a client machine receives a request to modify the time interval, wherein the request to modify depends on whether a period of increased packed loss is identified from the transmitted at least two packets. At block 503, the mean of time interval is modified from 'T' to "T'." At block 504, another at least two packets are transmitted by the server machine using UDP, the other at least two packets being separated by the time interval with modified mean T' (i.e., new 'T').

In one embodiment, the request to modify the time interval is sent by the client machine. In one embodiment, the client machine is operable to determine whether the transmitted at least two packets have a period of increased packet loss by using a first probe rate. In one embodiment, the client machine is operable to update the first probe rate to a second probe rate if the client machine determines that the transmitted at least two packets have a period of increased packet loss.

In one embodiment, the second probe rate is faster than the first probe rate. In one embodiment, the time interval is updated according to the second probe rate. In one embodiment, the client machine is operable to update the second probe rate to a third probe rate if the client machine confirms that the transmitted at least two packets have a period of increased packet loss. In one embodiment, the third probe rate is slower than the second probe rate but faster than the first probe rate. In one embodiment, the time interval is updated according to the third probe rate. In one embodiment, the client machine is operable to estimate packet loss probability, and perform hypothesis (H) test based on a threshold.

Figure 6:
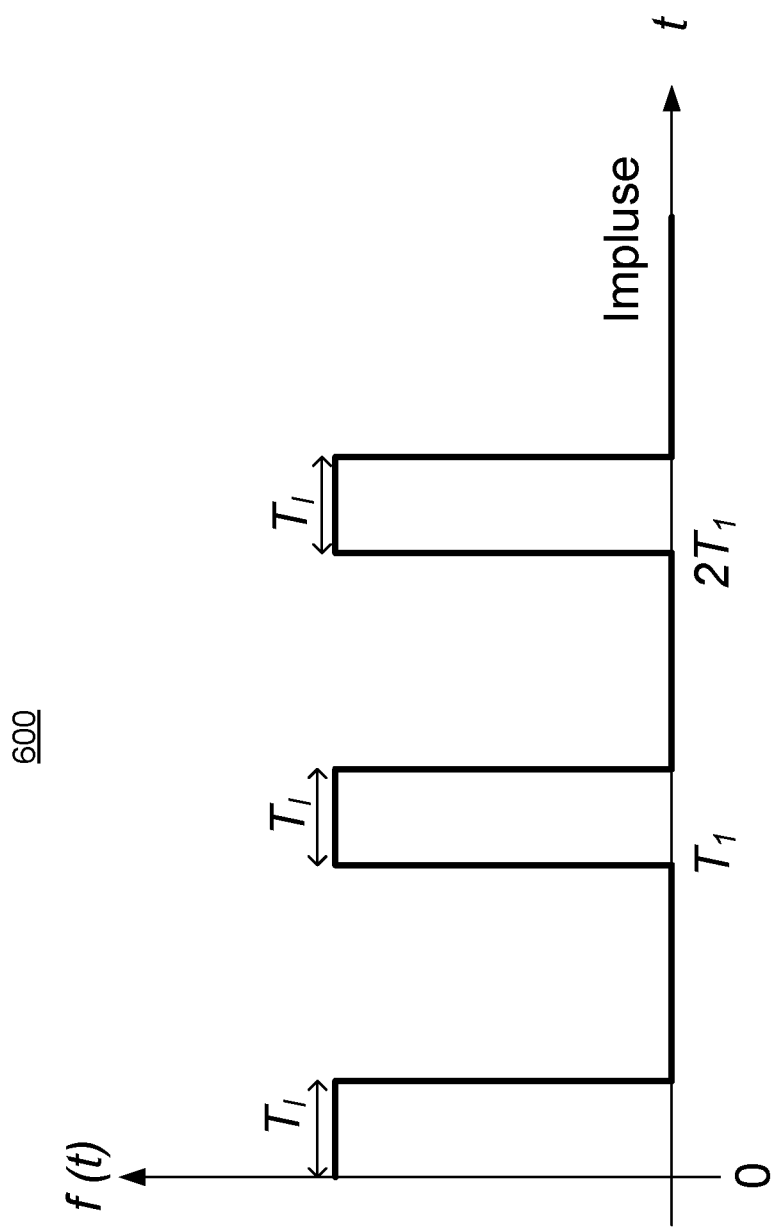
FIG. 6 is a plot showing periodic impulse event in a Digital Subscriber Line (DSL) access network.

FIG. 6 is a plot 600 showing periodic impulse event in a Digital Subscriber Line (DSL) access network. It is pointed out that those elements of FIG. 6 having the same reference numbers (or names) as the elements of any other figure can operate or function in any manner similar to that described, but are not limited to such.

In one embodiment, packet loss probability is estimated during impulse and no-impulse time durations. One way to estimate the packet loss probability is to assume that the communication link is modulated by a random process that switches between two states, 0 and 1. In one embodiment, these two states are intrinsically different in the sense of packet loss. For example, any packet transmitted in state 0 can be lost with probability p0 independently and identically. Further, in state 1, there are 'N' periodic impulses with inter-arrival time T1, where 'N' is an integer. During initial period TI of each periodic impulse, any transmitted packet may be lost. In one embodiment, number of impulses N, and peak impulse time interval TI are usually unknown, although periodicity T1 of impulses maybe known.

In plot 600, x-axis is time and y-axis is impulse intensity as a function of time, f(t). Plot 600 illustrates periodic impulses. In this example, impulse is strongest at the beginning of every impulse period T1 for peak impulse interval of length TI.

In one embodiment, optimal probing scheme is determined during above described states 0 and 1 of the communication channel to estimate respective loss probabilities of p0 (i.e., packet loss probability in state 0) and p1 (i.e., packet loss probability in state 1), where p0<<<p1, and where p1 is defined as:

$$p_1 = \frac{E[T_I]}{T_1}.$$

where 'E' is expectation or mean (ensemble average).

Figure 7:
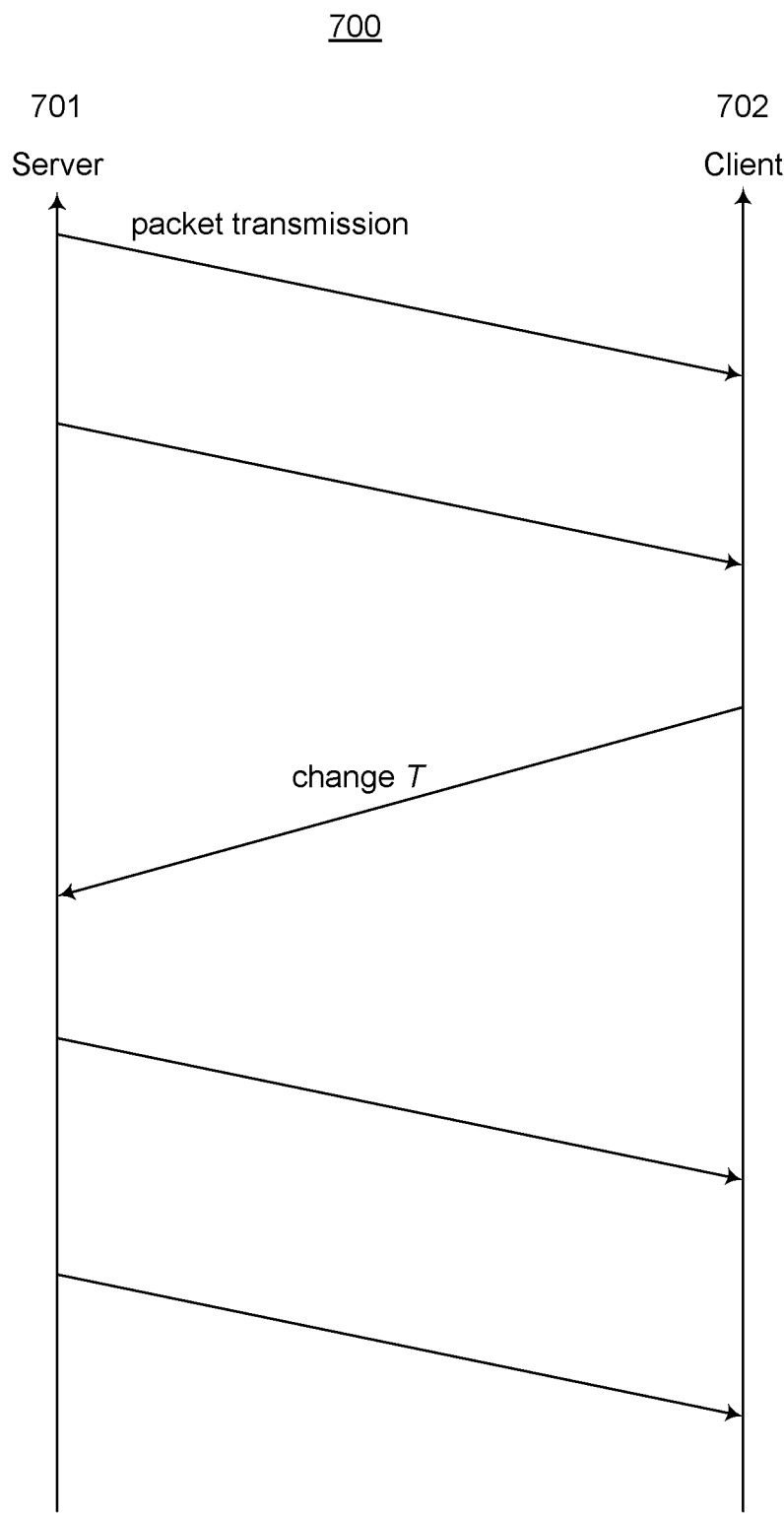
FIG. 7 is a client-server protocol for adaptive probing, according to one embodiment of the disclosure.

FIG. 7 is a client-server protocol 700 for adaptive probing, according to one embodiment of the disclosure. It is pointed out that those elements of FIG. 7 having the same reference numbers (or names) as the elements of any other figure can operate or function in any manner similar to that described, but are not limited to such.

Protocol 700 shows a server 701 (e.g., 105 of FIG. 1) and client 702 (e.g., 101). In one embodiment, adaptive probing scheme (as described with reference to FIG. 5) relies on client-server communication, where server 701 sends UDP probe packets to the client 702 and in turns receives feedback from client on probe-rate update. For example, client 701 sends feedback to server 701 to change 'T' i.e., rate of sending packets.

Figure 8:
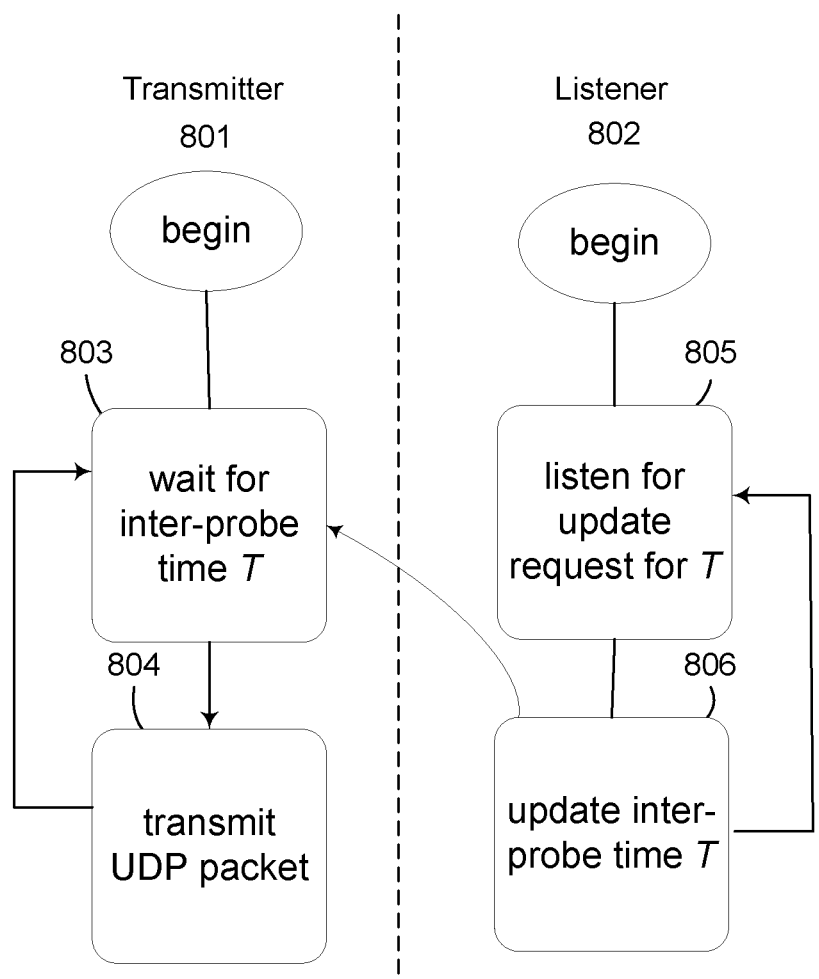
FIG. 8 is a flowchart for transmitter and listener thread at a server for packet loss estimation, according to one embodiment of the disclosure.

FIG. 8 is a flowchart 800 for transmitter and listener thread at a server for packet loss estimation, according to one embodiment of the disclosure. Although the blocks in the flowcharts with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 are optional in accordance with certain embodiments. The numbering of the blocks presented is for the sake of clarity and is not intended to prescribe an order of operations in which the various blocks must occur. Additionally, operations from the various flows may be utilized in a variety of combinations. It is pointed out that those elements of FIG. 8 having the same reference numbers (or names) as the elements of any other figure can operate or function in any manner similar to that described, but are not limited to such.

In one embodiment, two threads run at server 701. In one embodiment, the first thread is a transmitter thread 801 and the second thread is listener thread 802. In one embodiment, transmitter thread 801 waits for inter-probe time T as shown by block 803. In one embodiment, inter-probe time T is independent and exponentially distributed random time interval. In one embodiment, at block 804 transmitter thread 801 sends UDP packets to client 702 after independent and exponentially distributed random time interval T.

In one embodiment, at block 805, listener thread 802 of server 701 listens to the feedback from client 702. For example, listener thread 802 of server 701 listens for any update to mean probe-rate 1/E[T] (where 'T' is inter-probe time). In one embodiment, at block 806, mean of this time-interval T (where mean probe-rate is 1/E[T]) is adapted at server 701 based on feedback from client 702. In such an embodiment, transmitter 801 waits for the updated inter-probe time T at block 803 before sending the next UDP packet (see block 804) to client 702.

FIG. 9 is a state diagram 900 for packet loss estimation, according to one embodiment of the disclosure. It is pointed out that those elements of FIG. 9 having the same reference numbers (or names) as the elements of any other figure can operate or function in any manner similar to that described, but are not limited to such.

State diagram 900 comprises three states—901, 902, and 903. State 901 is State 0 when no impulse is detected on the communication link. In such an embodiment, probe rate is 1/T0. State 0 is the impulse-free state. State 902 is State 1 where probability of packet loss due to impulse is estimated. For this state, probe rate is taken to be 1/T1. State 903 is State 2 where impulse is detected on the communication link. In such an embodiment, probe rate is 1/T2. In one embodiment, probe rate 1/T1 is higher than probe rate 1/T2. One reason for aggressive probing in State 1 than State 2 is to identify the characteristics of the impulse, for example, duration/periodicity of impulse noise events.

In one embodiment, client 702 is assumed to be in one of the three states. In one embodiment, client 702 executes a thread 1000 as shown by FIG. 10. FIG. 10 is a flowchart 1000 of a thread executed by client 702 for conducting packet loss estimation, threshold based hypothesis test, and server notification, according to one embodiment of the disclosure.

In one embodiment, thread 1000 executes in each state—901, 902, and 903. In one embodiment, at block 1001, thread 1000 at client 702 continuously estimates the packet loss probability by fraction of lost packets to the transmitted ones in each state. Packet loss probability estimation is followed by a threshold based hypothesis (H) test (as shown in block 1002) on the estimated probability. Threshold based hypothesis test H0 is executed by State 0, threshold based hypothesis test H1 is executed by State 1, and threshold based hypothesis test H2 is executed by State 2. (hypothesis test Hi executed by state 'i', where 'i' is 0, 1, 2)

In one embodiment, the threshold based hypothesis test declares the next state of transition as shown by block 1003. At block 1004, the server 701 is notified by thread 1000 of client 701 to send probe packets with mean rate 1/Ti. In such an embodiment, the current state (from among states 901, 902, and 902) transitions to a newer statei, where 'i' is 0, 1 or 2.

Small loss probability in no impulse state may mean that any detected loss can trigger estimation state. In one embodiment, typical impulse is of length 10 minutes. In such an embodiment, an acceptable delay in detecting onset of impulse event is set to 1 minute. In one embodiment, in this state, a probe packet is sent every second, i.e. 60 probe packets are sent in a minute.

In one embodiment, a unique probing scheme is used that probes the channel independently with random inter-probing time exponentially distributed with mean T0 in State 0 and mean T1 in State 1. In such an embodiment, probability of packet loss is estimated as p=1−R(t)/N(t), where N(t) and R(t) are respectively the number of packets transmitted and successfully received in time duration t. The term "successful" here generally refers to an indication suggesting safe receipt of a packet that is often confirmed by ACK (acknowledge) message packet. The term "successful" also refers to reception at the receiver which is determined by looking at the received sequence numbers. In one embodiment, a receive-packet window stores received packets in order of their sequence number (i.e., mod the window length). In such an embodiment, number of lost packets can be identified by looking at the missing sequence numbers in this window to determine success of received packets.

In one embodiment, the mean of inter-probing time is changed from T0, when in State 0, to a larger value T1 for more accurate estimate of p1 when state changes from State 0 to State 1, where p1 is packet loss probability in State 1. In one embodiment, when state changes from State 1 to State 0, the mean inter-probing time is reduced.

In one embodiment, State 0 is assumed to be stationary in the sense, that packet loss probability p0 remains same every time in State 0. In such an embodiment, probability of packet loss p1 can possibly change every time in State 1. As described herein, in State 0, the probability of packet loss p0 is known before the state change. However, the packet loss probability p1 of the incoming State 1 may not be known. In State 1, the packet loss probabilities in both States 1 and 0 are known. In the following computation, Hi is the hypothesis that channel is in State i In one embodiment, for State 1, the detector that minimizes the probability of incorrect decision is the minimum distance detector, which can be expressed for large 'N' as:

$$\mathcal{H}_i = \mathrm{argmin}\left\{i \in \{0, 1\} : \frac{(\hat{p} - p_i)^2}{p_i(1 - p_i)}\right\},$$

where 'N' is the number of transmissions an estimate of packet loss probability is made. In State 1, the packet loss probability is assumed to be known for both states. In one embodiment, the decision regions are expressed as:

$$\mathcal{H}_0 = \{\hat{p} < p_{th}\} \quad \mathcal{H}_1 = \{\hat{p} < p_{th}\}$$

where threshold probability $p^1_{th}$ equals:

$$p^1_{th} = \frac{p_1 \sigma_0 + p_0 \sigma_1}{\sigma_0 + \sigma_1}$$

where σ is the variance of the respective states—State 0 and State 1. In State 0, the packet loss probability $p_1$ in State 1 is not known. In one embodiment, distribution of this random variable is used. In one embodiment, for large N, the optimal detector is expressed as:

$$\mathcal{H}_i = \mathrm{argmax}\left\{-\frac{N(\hat{p} - p_0)^2}{2p_0(1 - p_0)}, \log E \exp\left(-N \frac{(\hat{p} - p_1)}{2p_1(1 - p_1)}\right)\right\}$$

In one embodiment, a sub-optimal detector is used assuming the knowledge of the lowest value of probability of packet loss $p_m$ that can be interpreted as a result of impulse. This sub-optimal detector is expressed as:

$$\mathcal{H}_i = \mathrm{argmax}\left\{\frac{N(\hat{p} - p_0)^2}{p_0(1 - p_0)}, \frac{(\hat{p} - p_m)^2}{p_m(1 - p_m)}\right\}$$

Since impulse destroys a packet with some probability, for example, 0.14, probability of missed impulse detection is (1−0.14)60=1.1746×10-4 (i.e., with high probability, impulse event may be detected). In State 1 (901)—estimation state—mean probe rate (e.g., 1/8.3 kHz for 20 s) is used to estimate the loss probability. If estimated probability is above a pre-specified threshold, channel is in impulse state and state transitions from state 1 to state 2. Otherwise, the state transitions from State 1 to State 0.

In one embodiment, in State 2, six probe packets are sent every second and delay in detection of end of impulse event is 10 seconds. In such an embodiment, end of impulse event is detected if there are no lost packets in 10 seconds. For example, 60 probe packets are sent in 10 seconds. In this embodiment, the probability that at least one of these packets is dropped is 5.9982×10-4 (i.e., end of impulse period is detected in 10 seconds with high probability). Here, 5.9982×10-4 is achieved using p0=1e-5.

Probability of packet loss may be too small to affect any perceptible decrease in throughput. Therefore, in one embodiment, the mean probing rate 1/T0 is low in State 0 (901). A very low rate may delay the detection of impulse state. Therefore, in one embodiment, mean probe-rate in State 0 is governed by the acceptable delay in impulse detection. In one embodiment, once hypothesis test detects presence of impulse in State 0, mean probe-rate is requested to be increased in State 1.

In one embodiment, in State 1, probe-rate is increased to T1, matching the periodicity of impulse events in State 1. In one embodiment, State 1 lasts for a short time required for accurate estimation of packet loss probability in presence of impulse. In one embodiment, another hypothesis test is performed in State 1 to verify it was not a false alarm, and it was indeed an impulse event. In one embodiment, in case of a false alarm, state transitions back to impulse-free State 0 and server 701 is notified to reduce the mean probe-rate back to T0. In one embodiment, if hypothesis declares presence of impulse, the state diagram proceeds to State 3 and probe-rate is reduced to 1/T2 governed by the acceptable detection delay at the end of impulse event.

As discussed in the embodiments, UDP packets are utilized for probing. In one embodiment, UDP packets comprise 20 bytes of header. In one embodiment, the payload of a UDP packet contains sequence number that is used to detect packet loss probability. During impulse event, a single probing packet may be lost approximately every 12 probing packets. On the other hand, during no impulse event a single packet may be lost every 105 packet transmissions.

In one embodiment, a large maximum sequence number is used during no-impulse event. For example, 10 bytes or 80 bits may suffice for very large maximum sequence number that can be used during both impulse and no-impulse events. In one embodiment, frequent probing is performed during State 1 (901) to estimate the packet loss probability during the impulse event. In one embodiment, probing packet with mean periodicity of 8.3 ms is sent by server 701 to client 702 for 20 seconds. In one embodiment, for substantially exact detection of change of states, 30 bytes of data (i.e., probe data) is sent every 8.3 ms, i.e. 20×30/8.3 which is approximately 73 KB of data per impulse used for probing. If ten such impulses are present during the day, less than 1 MB of probe data is sent per day during the estimation phase of impulse events.

In one embodiment, during State 2 (903), 10×60×6×30=0.108 MB of probe data is sent per impulse. In such an embodiment, roughly 1 MB of data is sent daily for detection of end of impulse. In one embodiment, 24×60×60×30=2.6 MB of probe data is sent in whole day for no-impulse event. In such an embodiment, less than 5 MB of probe data is sent daily using the adaptive probing scheme 500. Compare this scheme to non-adaptive probing where with mean probe rate of 120 Hz, 24×60×60×30×120, which is approximately 311 MB of probe data, would be sent daily. In this example, the embodiment of adaptive probing is 60 times more efficient than non-adaptive probing.

Figure 11:
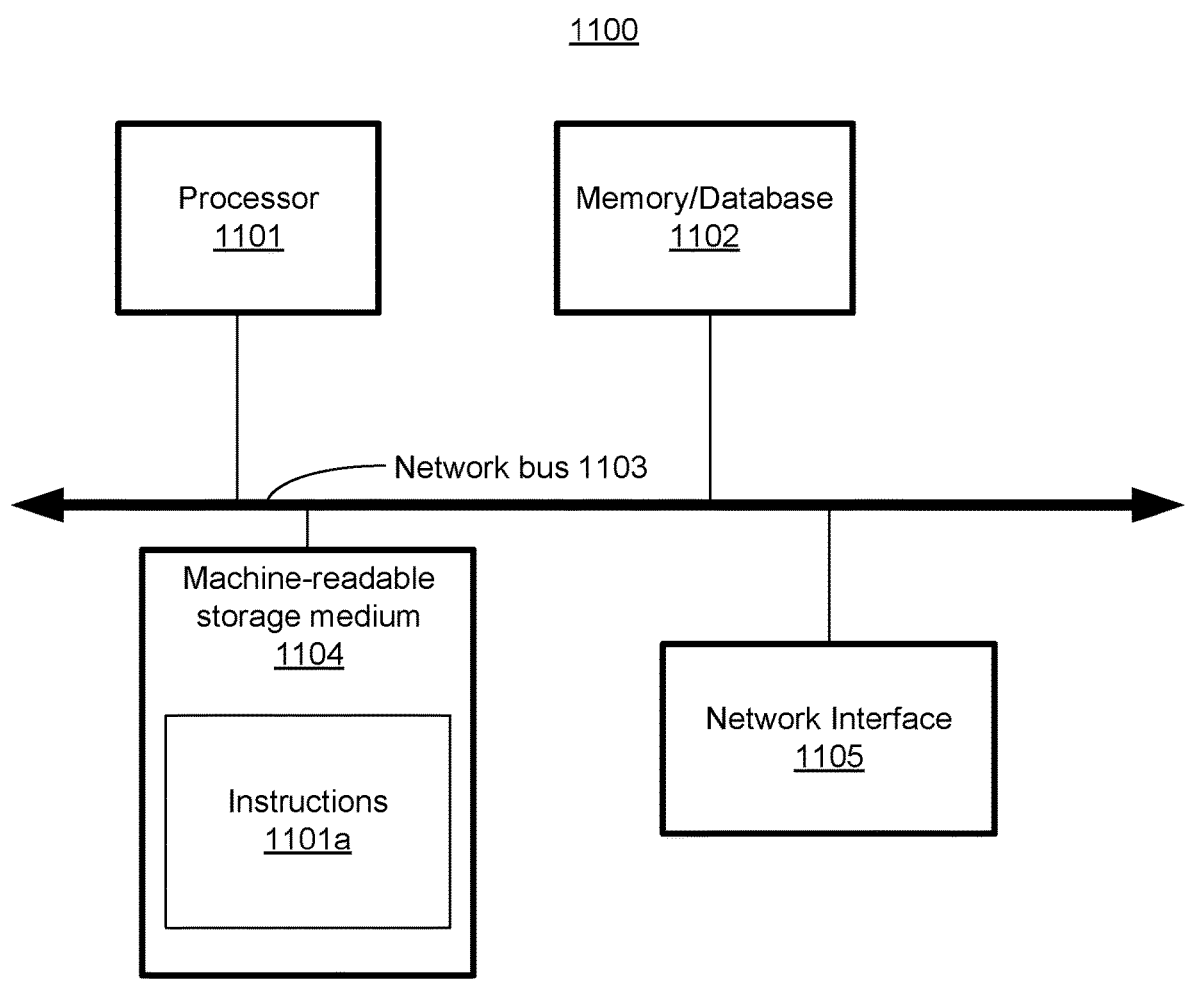
FIG. 11 is a processor-based system having machine-readable storage medium with computer executable instructions to perform the processes and methods, according to one embodiment of the disclosure.

FIG. 11 is a processor-based system having machine-readable storage medium with computer executable instructions to perform the processes and methods, according to one embodiment of the disclosure. In one embodiment, processor-based system 1100 comprises a processor(s) 1101, memory/database 1102, network bus 1103, machine-readable storage medium 1104, and network interface 1105.

In one embodiment, machine-readable storage medium 1104 and associated computer executable instructions 1104a may be in any of the communication devices and/or servers discussed herein. The computer-machine-readable/executable instructions 1104a are executed by processor 1101. Elements of embodiments are provided as machine-readable medium for storing the computer-executable instructions (e.g., instructions to implement the flowcharts and other processes discussed in the description).

In one embodiment, database 1102 is operable to store data used by the instructions 1104a (also called software code/instructions). In one embodiment, network interface 1105 is operable to communicate with other devices. In one embodiment, the components of processor-based system 1100 communicate with one another via network bus 1103.

The machine-readable storage medium 1104 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Program software code/instructions 1104a executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software." The program software code/instructions 904a typically include one or more instructions stored at various times in various tangible memory and storage devices in or peripheral to the computing device, that, when fetched/read and executed by the computing device, as defined herein, cause the computing device to perform functions, functionalities and operations necessary to perform a method, so as to execute elements involving various aspects of the function, functionalities, and operations of the method(s) forming an aspect of the disclosed subject matter.

For the purposes of this disclosure a module is a software, hardware, or firmware (or combinations thereof) system, process or functionality, or component thereof, that performs or facilitates the processes, features, and/or functions, functionalities and/or operations described herein (with or without human interaction or augmentation) as being performed by the identified module. A module can include sub-modules. Software components of a module may be stored on a tangible machine readable medium (e.g., 1104). Modules may be integral to one or more servers, or be loaded and executed by one or more servers. One or more modules may be grouped into an engine or an application.

A tangible machine readable medium (e.g., 1104) can be used to store program software code/instructions (e.g., 1104a) and data that, when executed by a computing device 1100, cause the computing device 1100 to perform a method(s) as may be recited in one or more accompanying claims directed to the disclosed subject matter. The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system 900 is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, in one embodiment, a method for estimating throughput between first and second communication devices is provided. In one embodiment, the method comprises: determining maximum bottleneck throughput of a communication link between the first communication device and a third communication device, wherein the communication link between the first and third communication devices applies a common access network; determining Round Trip Time (RTT) between the first and second communication devices; transmitting a packet by applying User Datagram Protocol (UDP) from the third communication device to the first communication device; measuring packet loss rate associated with the transmitted packet by monitoring sequence number of the packet; and translating measured packet loss rate to Transmission Control Protocol (TCP) throughput according to maximum bottleneck throughput and RTT.

In one embodiment, the method further comprises measuring packet arrival jitter associate with the transmitted packet by monitoring the arrival time stamps. In one embodiment, the packet loss rate is associated with packets in a transport layer. In one embodiment, the communication link includes one of a Digital Subscriber Line (DSL) link and a Wi-Fi link. In one embodiment, the method further comprises attributing a low throughput event to problems in the Wi-Fi link when both packet loss and packet arrival jitter are detected.

In one embodiment, the method further comprises: attributing a low throughput event to packet loss associated with the DSL link when packets are lost consecutively for more than a predetermined time. In one embodiment, measuring packet loss rate further comprises: monitoring one or more of network load, access network layer error count, or physical layer noise counter; and providing a confidence of the packet loss rate measurement according to results of the monitoring.

In one embodiment, translating measured packet loss rate to TCP throughput further comprises: reading the confidence of the packet loss rate measurement; outputting possible range of TCP throughput corresponding to the confidence of packet loss rate measurement; and outputting measurement failure message if the confidence is lower than a predetermined threshold.

In one embodiment, measuring packet loss rate further comprises: comparing upstream and downstream packet loss rates to determine packet loss rate associated with packets in the common access network. In one embodiment, determining the RTT comprises executing a ping command. In one embodiment, determining the RTT comprises: identifying a list of servers frequented by a user of the first communication device; and measuring the RTT for each of the identified list of servers.

In one embodiment, the communication link is a Digital Subscriber Line (DSL) link. In one embodiment, the first, second, and third communication devices are at least one of: an access point (AP); a base station; a wireless smart phone device; a wireless LAN device; an access gateway; a router, a Digital Subscriber Line (DSL) performance enhancement device; a DSL Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; an Ethernet connected network switch; and a server.

In another example, a machine executable storage medium is provided having machine executable instructions that when executed cause a machine to perform the method for estimating throughput between first and second communication devices as discussed above.

In another example, a method for adaptive probing to estimate packet loss probability is provided. In one embodiment, the method comprises: transmitting, by a server machine, at least two packets using User Datagram Protocol (UDP), the at least two packets being separated by a time interval; receiving a request to modify the time interval, wherein the request to modify depends on whether a period of increased packed loss is identified from the transmitted at least two packets; modifying the time interval; and transmitting another at least two packets using UDP, the other at least two packets being separated by the modified time interval.

In one embodiment, the request to modify the time interval is sent by a client machine. In one embodiment, the client machine to determine whether the transmitted at least two packets have a period of increased packet loss by using a first probe rate. In one embodiment, the client machine to update the first probe rate to a second probe rate if the client machine determines that the transmitted at least two packets have a period of increased packet loss. In one embodiment, the second probe rate is faster than the first probe rate.

In one embodiment, the time interval is updated according to the second probe rate. In one embodiment, the client machine to update the second probe rate to a third probe rate if the client machine confirms that the transmitted at least two packets have a period of increased packet loss. In one embodiment, the third probe rate is slower than the second probe rate but faster than the first probe rate. In one embodiment, the time interval is updated according to the third probe rate. In one embodiment, the client machine to: estimate packet loss probability; and perform hypothesis test based on a threshold.

In another example, a machine executable storage medium is provided having machine executable instructions that when executed cause a machine to perform the method for adaptive probing to estimate packet loss probability as discussed above.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A method for estimating throughput between communication devices, the method comprising:
    determining a first performance parameter of a first communication link that couples a first communication device to a third communication device;
    determining communication information between the first communication device and a second communication device that couples to the first communication device via a second communication link different from the first communication link, the first and second communication links sharing a common access network; and
    using at least the communication information and the first performance parameter to determine a second performance parameter of the second communication link.

2. The method of claim 1, wherein the first performance parameter is a packet loss rate of the first communication link, the second performance parameter is a Transmission Control Protocol (TCP) throughput of the second communication link.

3. The method of claim 2, wherein determining the first performance parameter of the first communication link comprising:
    transmitting User Datagram Protocol (UDP) packets from the first communication device to the third communication device and/or from the third communication device to the first communication device; and
    measuring the packet loss rate associated with the transmitted UDP packets by monitoring sequence number of the UDP packets.

4. The method of claim 2, wherein the UDP packets are generated by a probing packet generator in the first communication device or the third communication device.

5. The method of claim 2, wherein determining communication information comprises determining Round Trip Time (RTT) between the first communication device and the second communication device.

6. The method of claim 5, wherein determining the RTT comprises measuring the RTT for a list of servers frequented by a user of the first communication device.

7. The method of claim 5, wherein the TCP throughput of the second communication link is determined using the RTT, the packet loss rate of the first communication link, and a maximum bottleneck throughput that is measured on the first communication link.

8. The method of claim 1, wherein the common access network comprises one or more of:
    Digital Subscriber Line (DSL); and
    Wi-Fi.

9. A system for estimating throughput between communication devices, the system comprising:
    a first communication device couples;
    a first communication link coupling the first communication device to a third communication device, a first performance parameter of the first communication link is determined based at least on probing packets transmitted between the first communication and the third communication; and
    a second communication link coupling the first communication device to a second communication device, the first communication link and the second communication link sharing a common access network, a second performance parameter of the second communication link is determined using at least the first performance parameter of the first communication link and communication information and communication information between the first communication device and the second communication device.

10. The system of claim 9, wherein the first performance parameter is a packet loss rate of the first communication link, the second performance parameter is a Transmission Control Protocol (TCP) throughput of the second communication link.

11. The system of claim 10, wherein the probing packets comprise User Datagram Protocol (UDP) packets, the packet loss rate is determined by monitoring sequence number of the UDP packets.

12. The system of claim 11, wherein the UDP packets comprises at least one of:
uplink UDP packets transmitted from the first communication device to the third communication device; and
downlink UDP packets transmitted from the third communication device to the first communication device.

13. The system of claim 10, wherein communication information between the first communication device and the second communication device comprises Round Trip Time (RTT) between the first communication device and the second communication device.

14. The system of claim 10, wherein the TCP throughput of the second communication link is determined using the RTT, the packet loss rate of the first communication link, and a maximum bottleneck throughput that is measured on the first communication link.

15. The system of claim 9, wherein the common access network comprises one or more of:
Digital Subscriber Line (DSL); and
Wi-Fi.

16. A non-transitory computer-readable medium or media comprising one or more sequences of instructions which, when executed by one or more processors, causes steps for throughput estimation to be performed comprising:
determining a first performance parameter of a first communication link that couples a first communication device to a third communication device;
determining communication information between the first communication device and a second communication device that couples to the first communication device via a second communication link different from the first communication link, the first and second communication links sharing a common access network; and
using at least the communication information and the first parameter to determine a second performance parameter of the second communication link.

17. The non-transitory computer-readable medium or media of claim 16, wherein the first performance parameter is a packet loss rate of the first communication link, the second performance parameter is a Transmission Control Protocol (TCP) throughput of the second communication link.

18. The non-transitory computer-readable medium or media of claim 17, wherein determining the first performance parameter of the first communication link comprising:
transmitting User Datagram Protocol (UDP) packets from the first communication device to the third communication device and/or from the third communication device to the first communication device; and
measuring the packet loss rate associated with the transmitted UDP packets by monitoring sequence number of the UDP packets.

19. The non-transitory computer-readable medium or media of claim 17, wherein the communication information comprises Round Trip Time (RTT) between the first communication device and the second communication device.

20. The non-transitory computer-readable medium or media of claim 17, wherein the TCP throughput of the second communication link is determined using the RTT, the packet loss rate of the first communication link, and a maximum bottleneck throughput that is measured on the first communication link.

* * * * *